May 30, 1961 J. D. BORROFF ET AL 2,985,920
METHOD OF MAKING A CORED HEEL
Filed March 26, 1958 2 Sheets-Sheet 1
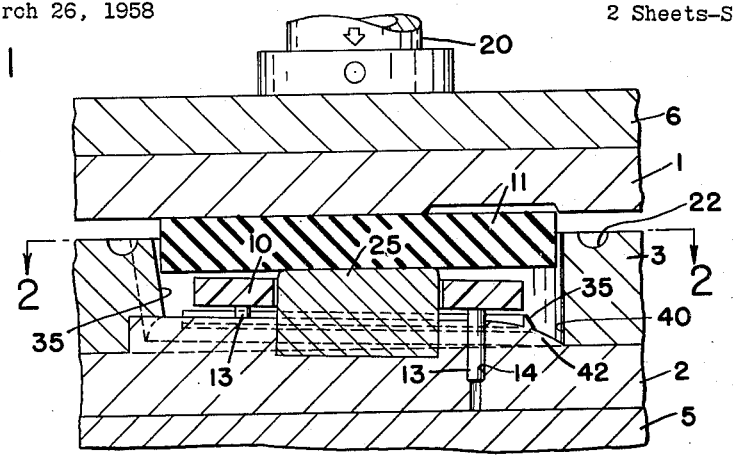
FIG. 1
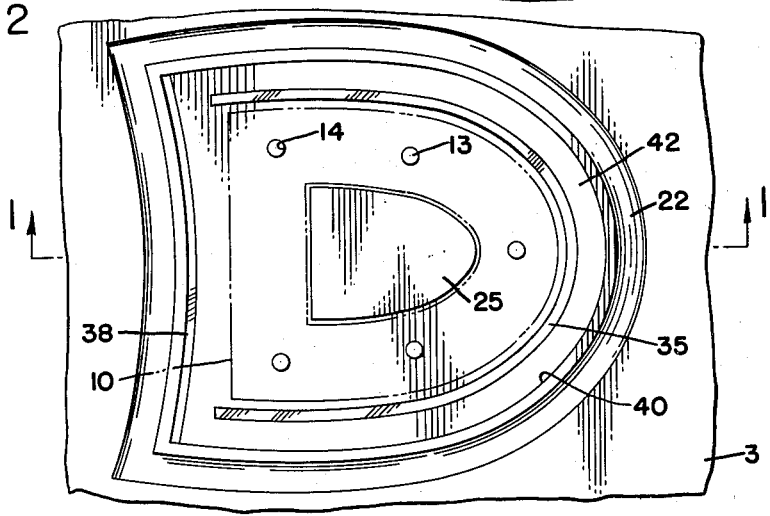
FIG. 2
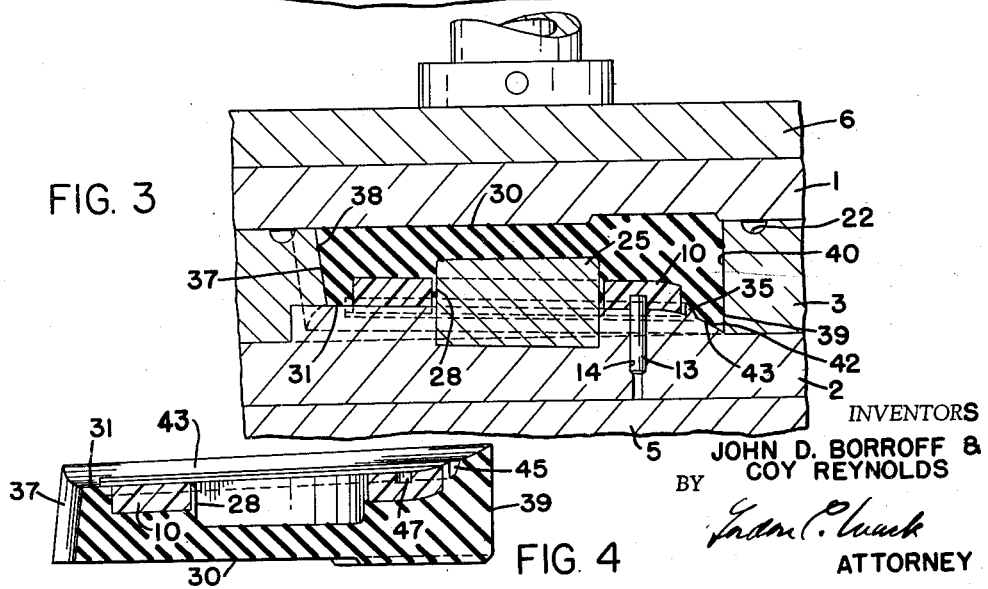
FIG. 3
FIG. 4
INVENTORS
JOHN D. BORROFF &
BY COY REYNOLDS
ATTORNEY

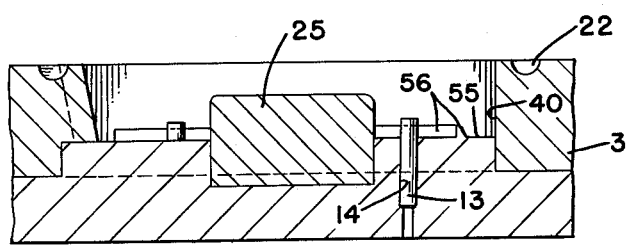
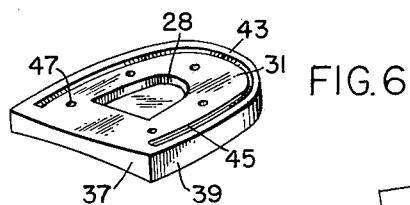
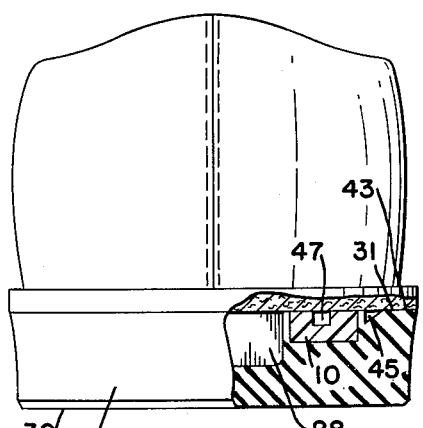
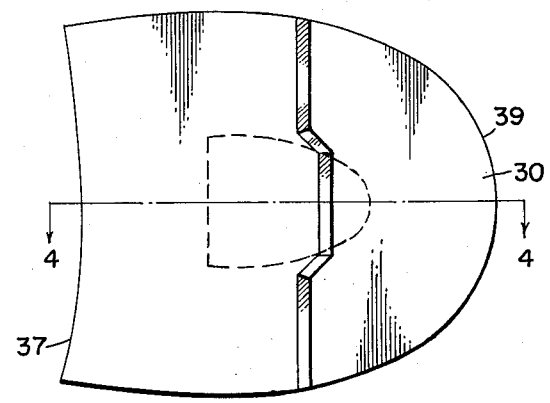
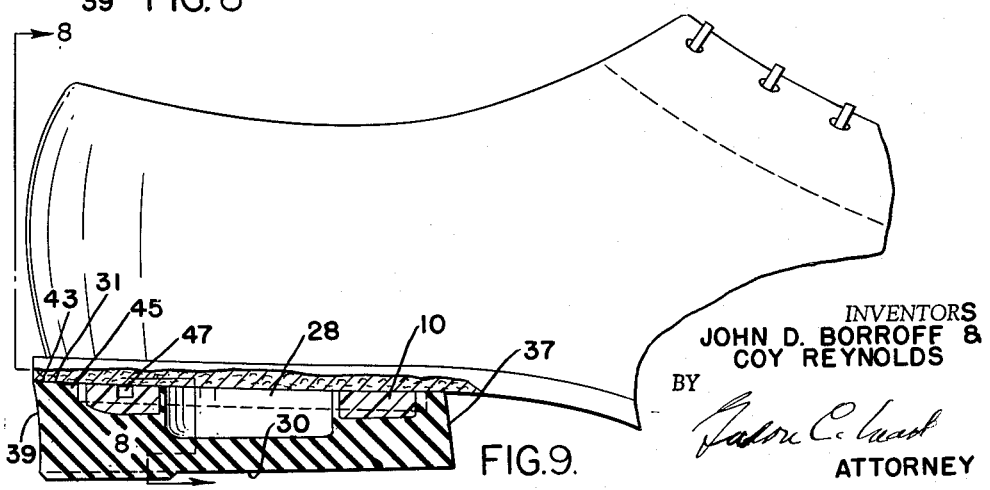

United States Patent Office 2,985,920
Patented May 30, 1961

2,985,920
METHOD OF MAKING A CORED HEEL
John D. Borroff, Wadsworth, and Coy Reynolds, Carey, Ohio, assignors to Seiberling Rubber Company, Barberton, Ohio, a corporation of Delaware
Filed Mar. 26, 1958, Ser. No. 724,163
3 Claims. (Cl. 18—59)

This invention relates to an improved method of forming a heel in a mold. The term "heel" is used herein to refer to that part of a shoe heel which forms the walking surface and includes whole heels, half heels, etc.

The desirability of including a plastic core in a rubber heel has been recognized, and plastics suitable for this purpose are known to the art. If the heel is to be nailed to the shoe, the plastic of the core must be nailable. It need not be nailable if the heel is to be attached to the shoe by an adhesive.

Rubber heels are usually cured in multiple-cavity molds. For example, each mold may contain sixty cavities. The difficulty with employing plastic cores has been that normally it takes several minutes for the operator to prepare all of the cavities in a single mold. The molds are not cooled appreciably between heats, and many cores melt or soften in the mold and flow away from their original location before the rubber is vulcanized.

To prepare a multiple-cavity mold, the cores and rubber are properly placed in the mold and the mold is closed. The heels are then cured under pressure at an elevated temperature, usually between 300 and 340° F. The molds are not cooled to room temperature between molding operations but are emptied and re-loaded while still hot. For instance, they may be as hot as 250 to 340° F. when reused.

When the cores come in contact with the hot surface of the mold or hot rubber they melt down and flow somewhat before the positioning of all the cores has been completed, or the plastic softens to the point where it flows when pressure is subsequently applied. If the plastic flows to the edge of the mold, or so near the edge that it will become exposed when the heel is eventually trimmed after being attached to a shoe, the edge of the heel will not present a uniform appearance. This objection, while it pertains to some extent to the breast of the heel, pertains more particularly to the convexly curved or outer edge of the heel.

The most satisfactory plastic cores are those which soften or melt at a temperature at or below the temperature of vulcanization. Even some thermoset plastics which become set when heated to the temperature of vulcanization, melt or soften and flow in the mold prior to vulcanization.

According to this invention, such flowing of the plastic to the edge of the heel is prevented by providing a dam near the core to prevent the flow of the core to the convexly curved edge of the heel.

A dam may be used with that type of mold disclosed in our copending application Serial No. 638,313 filed February 5, 1957, now abandoned, in which the mold is designed to maintain the core in a lifted position, out of contact with the surface of the mold, until the rubber is pressed into the mold.

If the rubber heel is provided with a rand—that is, a bevelled edge on its back surface for the purpose of levelling and/or giving a tight fit against the surface with which it is brought into contact—the depression in this surface formed by the dam is preferably located immediately inwardly of the rand or may be in the rand itself, so that when the heel is nailed to the bottom of a shoe the rand will flex outwardly from the depression formed by the dam, making firm and intimate contact with the surface to which it is attached.

The invention will be further described in connection with the accompanying drawings, in which—

Fig. 1 is a section on the line 1—1 of Fig. 2, of a partially closed heel mold being closed between platens, with a biscuit of rubber in the mold and a core supported on pins;

Fig. 2 is a plan view of this mold with the face plate removed;

Fig. 3 is a sectional view of the same mold after the press is closed;

Fig. 4 is a section on the line 4—4 of Fig. 5, through the finished heel;

Fig. 5 is a view of the bottom of the finished heel;

Fig. 6 is a view in perspective of the finished heel, showing its back;

Fig. 7 is a sectional view of a mold for molding a heel with a flat surface, i.e. without a rand;

Fig. 8 is a rear view on the line 8—8 of Fig. 9, of a shoe with the heel of Figs. 4 to 6 nailed thereto; and with a portion of the heel broken away; and Fig. 9 is a side view of the rear portion of the same shoe with the heel shown in section.

A heel mold is usually formed of a face plate 1, a back plate 2, and a middle plate 3. To form a heel, the mold is placed on the lower platen 5 before the rubber has been pressed into the mold so as to fill it, and the face plate 1 rests on the portion of the rubber which has not yet been forced into the mold. The mold is then closed by applying pressure to one or both of the platens, as illustrated in Fig. 1.

In forming the heel, a core 10 is put in each cavity, and rubber 11 is supplied to the mold. This rubber may be in the form of a biscuit, as illustrated in Fig. 1, or it may be supplied to the mold in any other form.

The mold of Fig. 1 shows pins 13 fitted in openings 14 in the back plate. When a core is placed on the pins, it is supported out of contact with the back plate of the hot mold until it is forced to the back plate of the mold by the pressure of the rubber against it. When rubber has been placed in the mold and the face plate is lowered by bringing the two platens toward one another, the core is forced down around the pins into contact with the heated back plate of the mold. Almost simultaneously therewith the rubber 11 is forced down over and around the core, surrounding it. If the core is melted by contact with the hot back plate of the mold, or softened so that it will flow under pressure, it can flow very little, because almost at the same time as it contacts the heated mold it is surrounded with rubber which restricts its flow. The dam minimizes such flow in an outward direction toward the edge of the heel.

Figure 1 shows the piston ram 20 being lowered so that the biscuit will be under pressure and the core will be pushed to the back plate of the model as the rubber of the biscuit flows and fills the mold cavity. The mold cavity is surrounded by the overflow groove 22 into which excess rubber flows as the press is closed.

The mold of Fig. 1 includes a central boss 25 which projects up through the opening in the center of the core. This boss prevents any substantial inward flow of the heated core plastic. It is not here considered to be a part of the back plate and it is conceivable that the core may be supported on the boss out of contact with the back plate and other surfaces of the hot mold before introducing the rubber into the mold.

The heel is molded upside down—that is, the surface 30 of the heel which contacts the face plate (Fig. 3) during the molding and curing of the heel is the walking-face 30 of the heel (Figs. 4 and 5) when it is applied to a shoe. Conversely, the back 31 of the finished heel (Figs. 4 and 6) is the surface 31 which is formed against the back plate of the mold.

The core, if a nailable plastic, receives the nails used to hold the heel to a shoe, and is located at or near the back surface of the heel, i.e. the surface which contacts the shoe. As shown in Fig. 1, it is placed in the mold cavity before the rubber is put into the cavity, and the rubber presses it against the back plate of the mold as it is pressed down against it and around it. In this way, the core is located inside of the dam 35 and any tendency to flow beyond the dam is greatly restricted. A slight overflow is not objectionable. In the mold shown in Figs. 1–3 this dam does not entirely encircle the core. The boss positively locates the core in the heel away from the breast 37. Even though the plastic of the core were to flow outwardly to the breast wall 38 of the mold, it would do little damage, as it is scarcely noticeable at this location. Because of the difference in the texture of the core plastic and the rubber, any plastic that is exposed on the convexly curved wall 39 of the heel (Figs. 4–6) by flowing outwardly to the curved wall 40 (Fig. 2) of the mold disfigures this curved wall of the heel and makes trimming more difficult. Also, because it is stiff it reduces or even destroys the contour-compensating factor of the flexible edge. It is to prevent such disfiguration, etc. that the dam 35 is provided.

In the mold shown in Figs. 1–3 the outer edge of the back plate of the mold, except across the breast of the cavity, slants downwardly and outwardly at 42 to produce the rand 43 (Figs. 4 and 6) around the edge of the heel. The dam 35 forms the depression 45 at the inner edge of this rand. This causes the entire rand to flex outwardly when the heel is nailed to a shoe, as shown more particularly in Figs. 8 and 9. As the heel is drawn to the shoe by nailing, the convexly curved wall 39 which is perpendicular before nailing (Figs. 4 and 6) becomes flared at the back surface as the depression is forced to spread by the pressure of the rand against the bottom of the shoe. Figs. 8 and 9 show this flaring on heels before trimming. The extra flexibility of the rand because of the depression 45 allows the heel to conform more readily to irregularities in the surface to which it is attached.

Pins 13 form depressions 47 (Figs. 4, 6, 8 and 9) in the finished heel.

The mold of Fig. 7 differs from the mold of the preceding figures in that the back plate of the mold is flat at 55. This produces a flat heel without a rand. The dam 56 prevents outward flow of the plastic toward the convexly curved edge of the heel.

The invention is not limited to any particular mold design. The face plate 1, back plate 2 and middle plate 3 may be used in numerous combinations and numerous methods of forming a heel may be used with each combination. For example, face plate 1 and middle plate 3 may be fastened together, back plate 2 being removable for production purposes. Or a two-piece mold (common in the industry) or other suitable type of mold may be used.

The dam of this invention is located on the back plate of the mold and forms a depression in the back of the heel. The depression formed by the dam is on the back surface of the heel and does not affect the ultimate appearance of the heel, because it is not exposed to view after the heel is applied to a shoe. As the heel is applied to the shoe, the depression permits relative movement of the different areas of the back surface of the heel on the opposite sides of the depression, and this is an advantage which is accentuated when the heel is formed with a rand.

The plastic of which the core is formed may be thermoplastic or thermosetting or a mixture of the two. It may for example, be composed essentially of any of the following: butadiene-styrene resin, butadiene-acrylonitrile resin, and tripolymers such as those produced from butadiene, styrene and acrylonitrile; polyvinyl chloride and copolymers of vinyl chloride and other monomers; mixtures of any one of the resins with one or more rubbers such as butadiene-acrylonitrile rubber; mixtures of butadiene-styrene rubber or butadiene-acrylonitrile rubber and modified phenol-formaldehyde plastics; urethane-type polymers, etc. A satisfactory formula is:

| | Parts by weight |
|---|---|
| Butadiene-styrene rubber [1] | 25 |
| Styrene-butadiene rubber [2] | 75 |
| Precipitated calcium carbonate | 40 |
| Zinc oxide | 5 |
| Stearic acid | 1 |
| Benzothiazyl disulfide | 1.5 |
| Tetramethylthiuram monosulfide | 0.15 |
| Sulfur | 2 |

[1] Emulsion—polymerized from 75 parts of butadiene and 25 parts of styrene.
[2] Emulsion—polymerized from 85 parts of styrene and 15 parts of butadiene.

The plastic compositions mentioned are illustrative and the invention is not limited thereto. Neither is the invention limited to the types or shapes or heels or molds illustrated. The cores may be of different shapes and designs, and the heels may be of different shapes and designs. The dams may or may not be a permanent part of the mold.

The term "rubber" is used therein to include natural rubber and synthetic elastomers which in the cured state have sufficient resilience for use in rubber heels. The terms "soften" and "softenable" are used in the claims to include "melt" and "meltable." The term "nail" and variations thereof are used to include staples and the like.

Claims to the heel are pending in Serial No. 31,359, filed May 24, 1960.

What we claim is:

1. The method of molding and curing the heel of a shoe in a heated mold having a cavity therein with a breast wall and side and back walls which extend from one end of the breast wall to the other end of the breast wall, using a nailable, flowably softenable plastic core, the mold being provided with a dam between the location for the core and said side and back walls of the cavity which dam is continuous from a location adjacent the breast wall of the cavity on one side thereof to a location adjacent the breast wall of the cavity on the other side, which method comprises temporarily holding the core near some part of the mold and out of contact with the surface of the mold cavity, and putting vulcanizable rubber composition in the mold cavity and then enclosing and applying pressure to the core and vulcanizable rubber composition in the mold cavity and heating the contents of the mold cavity to at least partially cure the rubber whereby the core is softened by heat and its flow toward all walls of the cavity except the breast wall is dammed without preventing its flow to the breast wall.

2. The method of molding the heel of a shoe in a mold cavity with a breast wall and another wall extending from one end of the breast wall to the other using a nailable, flowably softenable plastic core, the cavity having a back plate with a dam between the location for the core and the said other wall which dam is continuous from a location adjacent the breast wall on one side of the cavity to a location adjacent the breast wall on the other side of the cavity, which method comprises supporting the core adjacent the back plate on metal supporting means so small in area and so distributed as to prevent objectionable softening of the core due to conduction of heat from the supporting means thereto which results in objectionable flow of the core during completion of the heel, and then heating the contents of the cavity and thereby at least partially curing the rubber and by said pressure against the core causing it to flow toward the breast wall of the cavity while damming its flow toward said other wall.

3. The method of molding the heel of a shoe in a heated multiple-cavity mold, each cavity having a breast wall and another wall extending from one end of the breast wall to the other end of the breast wall using nailable, flowably softenable plastic cores with a central opening in each, each cavity having a back plate with a boss located to cooperate with the core opening and a dam between the location for the core and said other wall of the cavity and continuous from a location adjacent the breast wall at one side of the cavity to a location adjacent the breast wall at the other side of the cavity, which method comprises temporarily holding such a core out of contact with the back plate in each mold cavity, putting rubber in each cavity with the core positioned between the rubber and the back plate, and then by closing the mold pressing the rubber against the cores in the several cavities thereby moving the cores into contact with the back plates, and then with the cores so positioned heating the mold contents and thereby at least partially curing the rubber in each cavity and by said pressure causing each core to flow toward the breast wall of the cavity in which it is located while restricting its flow centrally by the boss, and by the dam restricting its flow toward said other wall of the cavity.

References Cited in the file of this patent

UNITED STATES PATENTS

| | | |
|---|---|---|
| 1,177,833 | Tufford | Apr. 4, 1916 |
| 1,465,775 | Bernstein | Aug. 21, 1923 |
| 1,681,217 | Bunker | Aug. 21, 1928 |
| 1,698,791 | Hadaway | Jan. 15, 1929 |
| 1,867,132 | Berenstein | July 12, 1932 |
| 1,877,298 | Goodwin | Sept. 13, 1932 |
| 2,135,335 | Harty | Nov. 1, 1938 |
| 2,135,570 | Ellis | Nov. 8, 1938 |

UNITED STATES PATENT OFFICE
CERTIFICATE OF CORRECTION

Patent No. 2,985,920                                  May 30, 1961

John D. Borroff et al.

It is hereby certified that error appears in the above numbered patent requiring correction and that the said Letters Patent should read as corrected below.

Column 2, line 61, for "model" read -- mold --; column 4, in the footnotes following the table, lines 1 and 3, after "Emulsion", each occurrence, the dash should appear as a hyphen; same column 4, line 31, for "therein" read -- herein --.

Signed and sealed this 17th day of October 1961.

(SEAL)
Attest:

ERNEST W. SWIDER
Attesting Officer

DAVID L. LADD
Commissioner of Patents
USCOMM-DC